Feb. 3, 1942.  A. D. MAST  2,271,898
CORN SHELLER
Filed Sept. 20, 1940    2 Sheets-Sheet 1
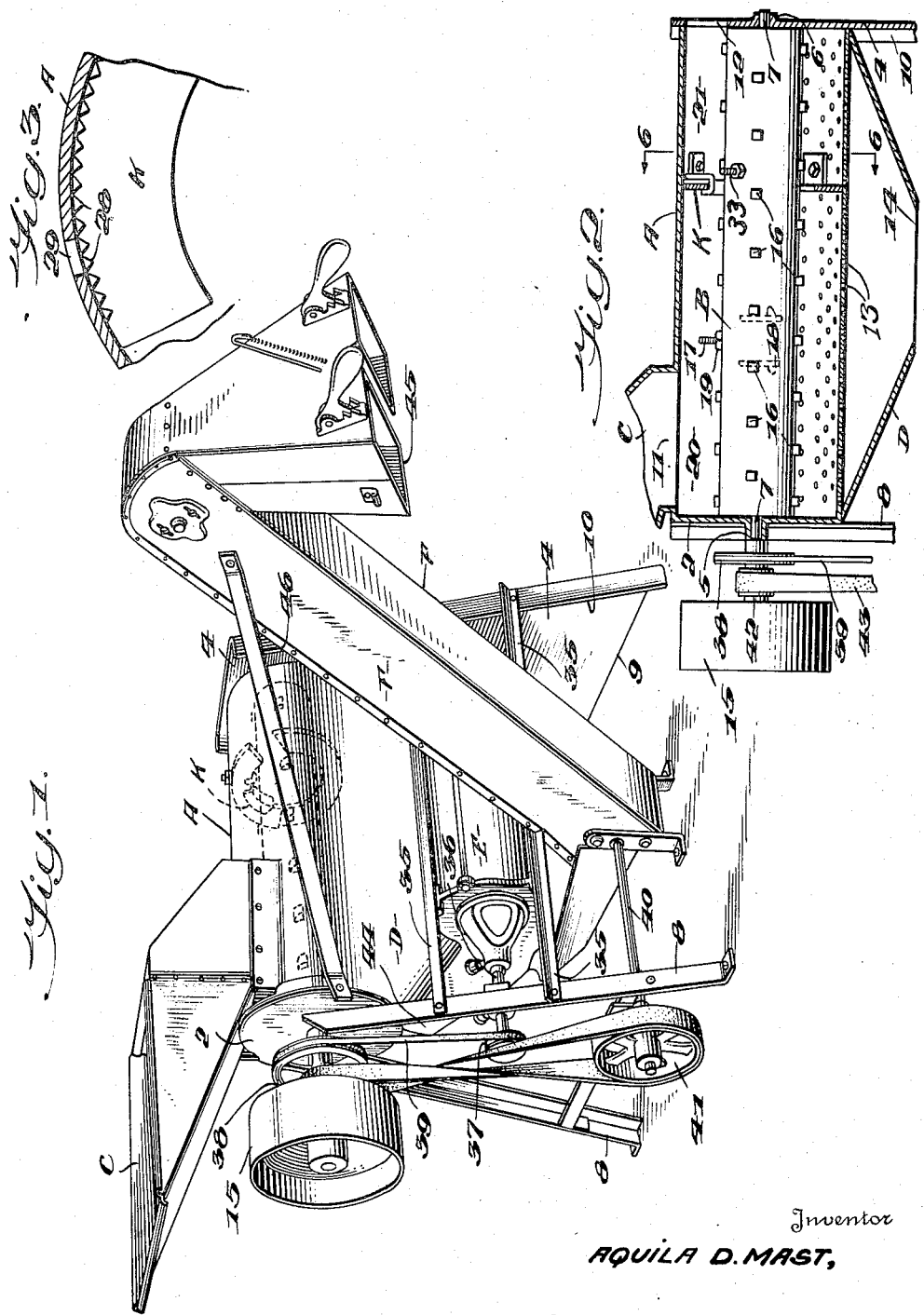
Inventor
AQUILA D. MAST,
By Babcock & Babcock
Attorneys Feb. 3, 1942.  A. D. MAST  2,271,898
CORN SHELLER
Filed Sept. 20, 1940  2 Sheets-Sheet 2
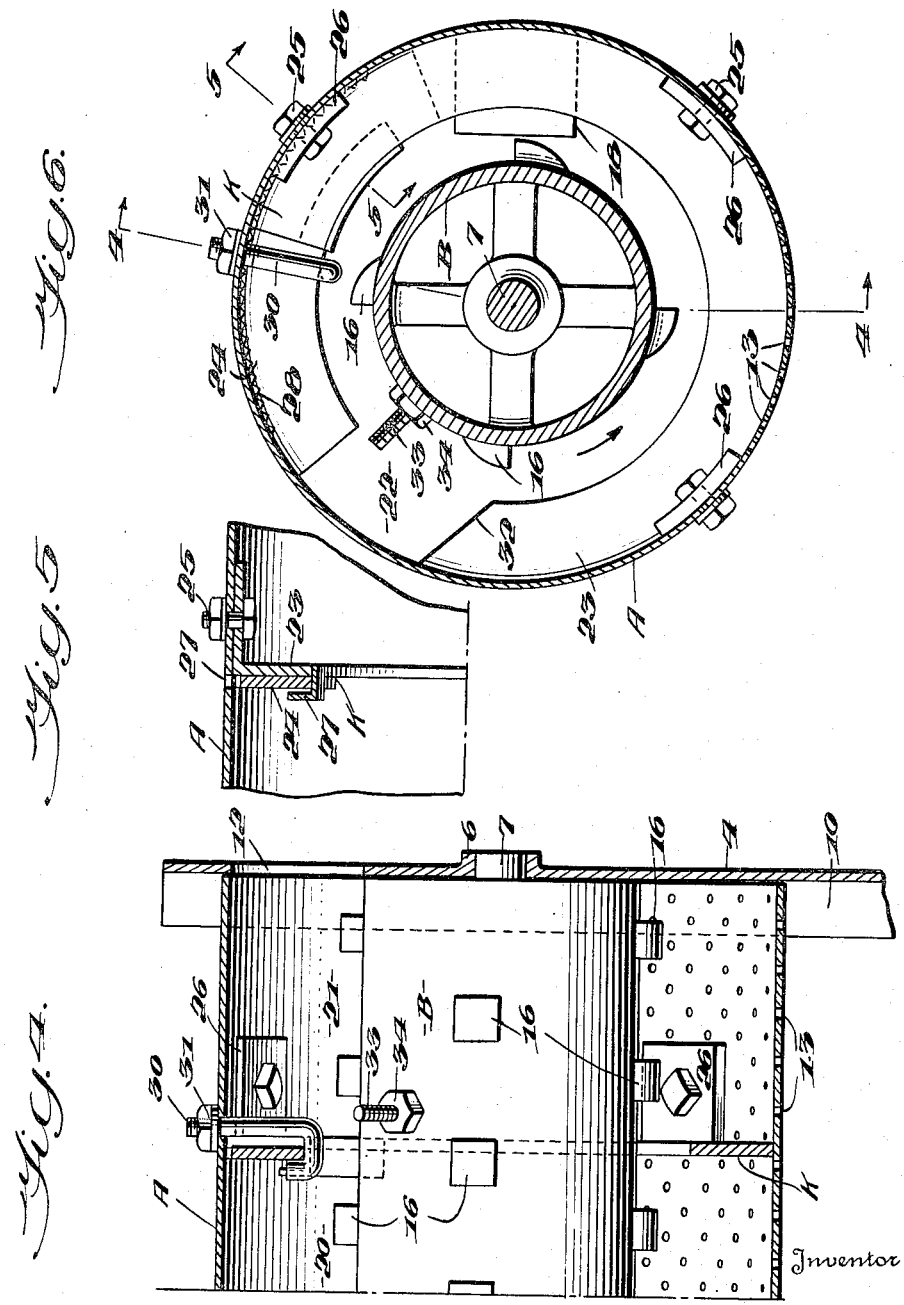
Inventor
AQUILA D. MAST,
By Babcock & Babcock
Attorneys Patented Feb. 3, 1942

2,271,898

UNITED STATES PATENT OFFICE 2,271,898

CORN SHELLER

Aquila D. Mast, Lancaster, Pa., assignor, by mesne assignments, to New Holland Machine Company, New Holland, Pa., a corporation of Pennsylvania Application September 20, 1940, Serial No. 357,637

12 Claims. (Cl. 130—6)

This invention relates to corn shellers and has particular reference to such shellers which are adapted for efficient use on corn which is unhusked or incompletely husked.

In corn shellers of the breast and cylinder type it has heretofore been impossible to secure an efficient substantially complete separation of the shelled corn from the cobs and husks before the cobs and husks were discharged from the machine through the cob gate or discharge aperture, particularly where the ears of corn being operated upon have been incompletely husked or are totally unhusked, and accordingly it has been considered necessary in the interest of economy to provide a vibrating sheave or cob shaker or screen externally of the shelter adjacent the cob gate to receive the cobs and husks as they are discharged and agitate them to sift out and salvage the grains of shelled corn which are mingled therewith. Such a cob shaker has, needless to say, involved considerable expense for its manufacture, required a considerable amount of power for its operation, and has of course rendered the entire machine more bulky and noisy in operation than is desirable.

Accordingly, having the foregoing considerations in mind, the present invention has for its objects: to provide a corn sheller which will completely separate the shelled corn from the cobs and husks in the machine, thereby eliminating any necessity for a cob shaker with its above enumerated disadvantages; to provide in such a corn sheller an internally mounted attachment or baffle enabling the shelter to carry out a complete separation of the shelled corn; to provide such a baffle or attachment which is adjustable so as to adapt the sheller for highly efficient operation on either husked or unhusked corn; to provide in combination with such a baffle means carried by the shelling cylinder for maintaining the baffle port clear; to provide such a baffle which is novel per se, is adapted for cheap mass production, and which may be readily applied to existing types of corn shellers; and to provide such an attachment or baffle which, when applied to a corn sheller, requires no additional power for its operation.

In this application I show and describe only the preferred embodiment of the invention, simply by way of illustration of the practice thereof, as by law required. However, I recognize that my invention is capable of other and different embodiments, and that the various details thereof may be modified in various ways, all without departing from my said invention; therefore, the drawings and description herein are to be considered as merely illustrative and not as exclusive.

In the accompanying drawings:

Figure 1 represents a perspective view of a complete corn husking machine embodying the present preferred form of my invention;

Figure 2, a reduced size axial vertical diagramatical section through the upper part of the machine illustrated in Figure 1;

Figure 3, a detail fragmentary transverse section through the breast or jacket of the sheller illustrating the adjusting means for the baffle or attachment of my invention;

Figure 4, a section on the line 4—4 of Figure 6, looking in the direction of the arrows;

Figure 5, a section on the line 5—5 of Figure 6, looking in the direction of the arrows; and, Figure 6, an enlarged section on the line 6—6 of Figure 2, looking in the direction of the arrows.

Referring now in detail to the accompanying drawings, wherein is illustrated a breast and cylinder type corn husking and shelling machine having my invention applied thereto in the manner at present preferred by me, it is to be understood that the corn husking and shelling machine shown is merely illustrative of the breast and cylinder type of machine to which my invention may be applied, and that my invention may be applied to various other shelling or husking and shelling machines of this general type.

In the form of machine illustrated, the letter A designates in its entirety the usually substantially horizontally disposed or supported sheet metal or other suitable material preferably cylindrical breast or jacket defining a cylindrical chamber in which is disposed preferably coaxially for rotation the usual shelling or husking and shelling cylinder or drum designated B in its entirety.

The jacket or shell A is provided with suitable end closures or plates 2 and 4 respectively which may be formed with centrally disposed axially aligned journals or bearings 5 and 6 respectively to receive and rotatably support a preferably coaxially disposed sheller cylinder shaft 7 journalled therethrough and on which the cylinder B is mounted, this constituting one convenient and usual way of mounting cylinder B for rotation in the shell or jacket A.

Any suitable means may be employed for supporting the jacket A in a substantially horizontal position, it being understood that for the purpose of the present specification and claims the term "substantially horizontal" is intended to be applicable either to a horizontally disposed jacket or one which slopes downwardly somewhat towards its discharge end to facilitate the passage of the corn therethrough in accordance with well known practices. As an example of such supporting means a pair of downwardly diverging angle iron legs 8 may be suitably attached at their upper ends to the disc shaped end closure plate 2 at the intake end of the jacket to support said intake end, while suitable supporting means for the discharge end of the jacket may be provided by extending the closure plate downwardly as shown in Figure 1 so that its lower extremity or edge 9 may rest on a supporting surface, the laterally opposed edges or edge portions of the plate 4 being bent at right angles to the remainder of said plate, if desired, to form downwardly disposed integral reinforcing flanges or leg members 10.

Formed in the upper cylindrical portion of the jacket A at its intake end, preferably adjacent the end closure plate 2, is the usual upwardly disposed intake aperture 11 over which may be mounted any suitable form of feed hopper C to facilitate the feeding of corn through said intake aperture 11 into said jacket A; and the usual discharge aperture or cob gate 12 is formed in the upper portion of the end closure plate 4 of said jacket A to permit discharge of the corn cobs and husks.

Formed in the bottom cylindrical wall portion of the jacket A between the intake and discharge apertures 11 and 12 thereof is a series of preferably evenly spaced and distributed shelled corn discharge perforations 13 through which the loose grains of shelled corn may be discharged after they have been removed from the cobs by the action of the shelling cylinder B.

The shelling, or husking and shelling cylinder B may, as hereinbefore mentioned, be mounted on and keyed to the shaft 7 for rotation therewith, and rotary motion may be supplied thereto in any suitable manner, though for this purpose there is shown in the accompanying drawings a drive pulley 15 keyed to one end of the shaft 7 externally of the jacket A and adapted to have rotary motion transmitted thereto by means of a belt from any suitable source of power.

Any usual construction of cylinder B may be employed, the cylinder being of usual diameter relative to the jacket A whereby in assembled position its cylindrical wall or surface is spaced radially inwardly from the inner surface of the shell or jacket A to leave a preferably annular space for reception and passage of the corn, and being formed or provided with a series of spaced radially projecting shelling teeth or studs 16 distributed preferably evenly over its entire cylindrical surface.

Since the machine embodying my invention will often be employed in shelling partially or wholly unhusked corn, as well as corn which has been husked, it is desirable to provide therein means in addition to the shelling teeth 16 which are particularly adapted to perform the husking operation, although such means are not essential, and to this end there may be disposed on the shelling cylinder B a rigidly attached radially outwardly projecting husking pin 17 adapted to rotate between a pair of radially inwardly projecting bosses 18 fixedly attached within the jacket A preferably to one side of the cylinder B and near the intake end of the jacket A. In the event it is desired to make the pin 17 radially adjustable so that it can be made to project just the proper distance for obtaining the most efficient husking action, the pin 17 may be screwed into the cylinder B and have a lock nut 19 threaded about its base, so that after it has been turned to the desired radially projecting position the lock nut 19 may be turned into engagement with the cylinder B to fixedly maintain said pin in its desired position of adjustment.

If desired, any usual form of shelled corn hopper D may be disposed beneath the jacket A to receive the grains of shelled corn discharged through the perforations 13 thereof, the illustrated form of hopper preferably being funnel shaped and formed with a downwardly disposed opening 14 through which the grains of corn may drop downwardly through a transverse blast of air from the usual chaff blower or cleaning fan E into the lower end portion of the usual bagger or elevator F disposed beneath said funnel or hopper D.

The aforementioned chaff blower E and bagger F are of usual construction and arrangement, the chaff blower E preferably being of the centrifugal type carried by transverse frame members or angle irons 35 and disposed to blow a strong current of air beneath the bottom opening of hopper D through a spout 44 to separate comparatively light dust particles, and cob and husk fragments etc., from the comparatively heavy grains of corn, the air current carrying said dust particles etc. transversely out through the spout 44 while the grains of shelled corn fall substantially vertically through the air current into the lower end of the bagger F.

The bagger F may also be of any usual preferably centrifugal type adapted to elevate the shelled corn upwardly and discharge it through the bagger discharge spouts 45, said bagger being attached to the lower frame member 35 at its lower end and having its upper end supported by straps 46 extending from the jacket A.

Both the chaff blower E and bagger F may have pulleys 37 and 41 keyed or otherwise fixedly mounted on their respective rotary shafts 36 and 40 to receive rotary motion through belts 39 and 43 respectively from their respective drive pulleys 38 and 42 mounted on the main drive shaft 7 for rotation therewith. Of if desired any other suitable driving means for said chaff blower E and bagger F may be employed.

The hereinbefore referred to elements and their arrangement are all well known and are not claimed per se as my invention, but are illustrated and referred to in order to promote an intelligent understanding of my invention which is applied thereto and combined therewith.

My invention resides primarily in attaching within the jacket or breast A of such a machine as hereinbefore described a partition or baffle, designated K in its entirety, which serves to effectually divide the unoccupied annular space within the shelling chamber into two axially aligned annular compartments 20 and 21, which will for the sake of convenience be termed the shelling compartment and the separating compartment respectively. The baffle K will be preferably disposed in such a longitudinal position in the jacket A that the husking and shelling of the corn will have been completed or substantially completed by the time it reaches the baffle K during its progress through the jacket A, and accordingly in actual practice the baffle K will generally be disposed substantially closer to the discharge end of the jacket A than it is to the intake end thereof.

The baffle K will be so formed and disposed as to prevent passage of all but a very small portion of the shelled corn from the shelling compartment 20 into the separating compartment 21 during operation of the machine, while permitting such passage of the cobs and husks, and fragments thereof, into the separating compartment 21, and to this end may be provided in any suitable manner with an upwardly disposed port 22 establishing communication between the compartments 20 and 21, whereby the cobs and husks which are of relatively large size will be engaged by the teeth or studs 16 of the cylinder B and whirled around and urged through the port 22, while the considerably smaller grains of shelled corn which have not up to this point been completely discharged through the perforations 13 will, with the exception of a few grains that are intermingled with the cobs and husks, settle to the bottom portion of the shelling compartment 20 out of engagement with the shelling cylinder and be discharged through the perforations 13 in said compartment. Thereafter, the comparatively few grains of shelled corn which are mixed with the cobs and husks and carried into the separating compartment therewith will be whirled around with the cobs and husks until separated therefrom, whereupon they will drop to the bottom of the jacket and be discharged through the perforations 13 of the separating compartment 21, and the cobs and husks will be discharged through the cob gate 12 in the usual manner after the shelled corn has been thus separated therefrom.

Once having the foregoing inventive concept in mind, it is believed to be apparent that the invention may be carried out in various ways, and accordingly it is to be understood that the present preferred embodiment of baffle K illustrated and described in detail hereinafter is merely illustrative of my invention, and that the various details thereof may be altered in various ways without departing from my said invention.

The prefered form of baffle illustrated in the accompanying drawings is adjustable to vary the size of the upwardly disposed port 22, and to this end comprises a stationary main segment 23 and an overlapping circumferentially extensible segment or extension segment 24 constituting a circumferential continuation or extension of one end of said main segment and adjustable towards the other end thereof to vary the distance between, and consequently the size of the port defined by, said ends.

The said main segment 23 is of arcuate upwardly curved, or annularly segmental shape, disposed continuously circumferentially across the bottom of jacket A beneath the cylinder B with its ends extending circumferentially into the upper portion of the jacket and spaced apart a substantial distance in a circumferential direction to define a fixed size aperture. In its assembled position in the jacket A the outer peripheral edge of the baffle segment 23 is disposed in snug conforming engagement with the inner surface of the jacket A and may be fixedly retained in this position, as well as in its proper longitudinal position, by means of bolts 25 passing through preferably integral longitudinally extending ears or flaps 26 formed on said baffle 23, and the adjacent wall of the jacket A. Obviously the specific form of retaining means employed is rather immaterial and the illustrated form may be replaced by some other suitable arrangement accomplishing the same end if desired.

As shown, the baffle segment 23 extends radially inwardly into near engagement with the cylinder B at its inner peripheral edge, said edge preferably being disposed concentrically about said cylinder so as to be evenly spaced therefrom.

If desired, the extension segment 24 or other adjusting means may be omitted, however it is desirable to have some adjusting means for varying the size of the port 22 to adapt the same for efficient operation under various conditions. By way of explanation, where the corn being operated on is completely husked prior to being placed in the machine, the machine will operate most efficiently with the port in a fairly wide open position, since the shelled corn will be mostly discharged from the shelling chamber 20 through its perforations 13 by the time it reaches the baffle K and there will not be any considerable tendency for the grains of corn to become intermingled with the cobs and carried through the port 22 therewith, but they will tend to separate from said cobs and settle to the bottom of the jacket to be discharged through the perforations 13, and obviously the wider open the port 22 can be maintained while at the same time causing an efficient separation of the shelled corn, the more rapid will be the pasasge of corn through the machine. However, where the corn has been incompletely husked or not husked at all, a considerable amount of the shelled corn will tend to become mixed up in the husks and be carried through the port 22 therewith unless the port is adjusted to a comparatively small size to delay the passage of the husks and cobs therethrough, thereby causing a longer stay and longer period of agitation and whirling around of the husks and cobs prior to their passage through the port 22 and producing a more complete separation of the shelled corn from the cobs and husks than would be the case if the port 22 were left wide open.

Accordingly, the extension segment 24, which is of preferably the same radial dimensions as the main segment 23 and constitutes a circumferential continuation thereof, may be disposed in overlapping relationship at one end of the main segment 23 for sliding circumferential adjustment, and to this end it is desirable to form the main baffle segment 23 adjacent said end with a track or channel member 27 to slidably receive the radially inner edge of the extension segment 24 and support and guide the same in its movement.

In order to permit ready access to, and adjustment of the segment 24, it is desirable to form a series of notches 28 in the outer periphery thereof, and to form a slot 29 in the cylindrical wall of jacket A in registry with the notched portion of segment 24 so that a drift or punch may be inserted substantially tangentially therethrough into driving engagement in one of said notches 28 and tapped with a hammer or other instrument to move said extension segment 24 to the desired position of adjustment. Preferably the slot 29 is of no greater width than the segment 24 and will accordingly be covered by said segment so as to prevent the escape of dust through said slot during operation of the sheller.

Any suitable means may be provided for fixedly maintaining the extension segment or extension 24 in any desired position of adjustment, the illustrated means consisting of a J-bolt 30 disposed through the cylindrical wall of jacket A and having its curved lower end disposed beneath and around the inner edge or periphery of said segment 24, the upper end of said J-bolt projecting externally through the jacket wall and having an adjusting nut 31 threaded thereon, whereby tightening of said nut 31 will tend to draw the extension 24 into tight peripheral frictional engagement with the interior of the jacket A, as shown in Figures 4 and 6 of the accompanying drawings.

Since, in passing through the port 22, the corn cobs and particularly the husks may tend to become jammed against and collect on the edge 32 of the baffle by the rotation of the cylinder B in the direction indicated by the arrow in Figure 6, thereby clogging said port, it is desirable to incline said edge in a somewhat tangential direction, as shown, to minimize such jamming by providing an edge which slopes relatively to the direction of movement of the husks and cobs, and additionally to provide a stud or radially projecting beater pin 33 rigidly attached to the cylinder B within the separating compartment 21 adjacent baffle K to during rotation engage and dislodge any husks or cobs which may be lodged in and projecting through the port 22. If desired, the pin 33 may be made radially adjustable by screwing it into the cylinder B whereby it may be turned to the desired radially projecting position, and providing it with a lock nut 34 threaded about its base to be turned into engagement with the cylinder B after the pin 33 has been thus adjusted.

In the complete operation of the entire machine herein described, the husked or unhusked corn is dropped into the feed hopper C and slides down the sloping bottom thereof into the shelling chamber 20 where the husking operation is facilitated by the action of the husking pins and bosses 17 and 18 respectively, the corn being husked and shelled by the cylinder B in the usual manner and the shelled corn being discharged through the perforations 13, the corn being urged longitudinally through the machine towards the discharge end thereof by the pressure of additional corn entering through the feed hopper C, as well as by the action of the husking teeth 16 which may be arranged to facilitate such feeding by disposing them in a spiral direction, or by the slope of the jacket A where the same is disposed in a somewhat sloping direction towards its discharge end, as hereinbefore mentioned, all of these arrangements being old and well known.

The baffle K will cause a complete separation of the shelled corn from the cobs and husks in the manner hereinbefore mentioned, the husks and cobs being discharged through the cob gate 12 in the usual manner, and the shelled corn being received in the hopper D, escaping through the bottom thereof to be cleaned by the chaff blower E in the manner hereinbefore set forth, and finally being received in the bagger F and discharged through the spouts 45 thereof into bags or other suitable receptacles.

It may be seen from the foregoing that my invention eliminates any need for the conventional shaker screen or cob shaker such as has heretofore been considered a necessary adjunct of corn shellers; also that my invention be easily manufactured and sold as an article or accessory which may be installed in existing corn shellers without requiring any substantial alteration thereof.

I claim:

1. A corn sheller comprising a cylindrical horizontally extending jacket formed with a series of shelled corn discharge perforations in its lower portion and having intake and discharge apertures at its respective intake and discharge ends, an axially disposed drive shaft journalled for rotation through said jacket, and a sheller cylinder mounted on said shaft for rotation therewith, in combination with an arcuate circumferentially extensible baffle disposed in said jacket between said apertures with its medial portion beneath said cylinder and its ends extending circumferentially into, and being spaced apart in, the upper part of said jacket to form an upwardly disposed port, said baffle comprising a main arcuate segment fixedly internally secured to said jacket and formed with a circumferential guide track at one end, an arcuate extension disposed in said guide track in overlapping circumferentially adjustable relationship at said end to vary the size of said port, said extension being formed with a series of notches in its outer periphery in registry with a slot formed in said jacket to permit external adjustment of said extension, and means for maintaining said extension in any desired position of adjustment comprising a J-bolt disposed through the wall of said jacket with its curved end extending around the inner edge of said extension to when tightened maintain the outer periphery of said extension in tight frictional engagement with the jacket wall.

2. A corn sheller comprising a cylindrical horizontally extending jacket formed with a series of shelled corn discharge perforations in its lower portion and having intake and discharge apertures at its respective intake and discharge ends, an axially disposed drive shaft journalled for rotation through said jacket, and a sheller cylinder mounted on said shaft for rotation therewith, in combination with an arcuate circumferentially extensible baffle disposed in said jacket between said apertures with its medial portion beneath said cylinder and its ends extending circumferentially into, and being spaced apart in, the upper part of said jacket to define an upwardly disposed port, said baffle comprising a main arcuate segment fixedly internally secured to said jacket and formed with a circumferential guide track at one end, an arcuate extension disposed in said guide track in overlapping circumferentially adjustable relationship at said end to vary the size of said port, said extension being formed with a series of notches in its outer periphery in registry with a slot formed in said jacket to permit adjustment of said extension from the exterior of said jacket, and means for maintaining said extension in any desired position of adjustment.

3. A corn sheller comprising a cylindrical horizontally extending jacket formed with a series of shelled corn discharge perforations in its lower portion and having intake and discharge apertures at its respective intake and discharge ends, and a sheller cylinder mounted coaxially for rotation in said jacket, in combination with an arcuate circumferentially extensible baffle disposed in said jacket between said apertures with its medial portion beneath said cylinder and its ends extending circumferentially into, and being spaced apart in, the upper part of said jacket to define an upwardly disposed port, said baffle comprising a main arcuate segment fixedly internally secured to said jacket and formed with a circumferential guide track at one end, an arcuate extension disposed in said guide track in overlapping circumferentially adjustable relationship at said end, and means for maintaining said extension in any desired position of adjustment.

4. A corn sheller comprising a cylindrical horizontally extending jacket formed with a series of shelled corn discharge perforations in its lower portion and having intake and discharge apertures at its respective intake and discharge ends, and a sheller cylinder mounted coaxially for rotation in said jacket, in combination with an arcuate circumferentially extensible baffle disposed in said jacket between said apertures with its medial portion beneath said cylinder and its ends extending circumferentially into, and being spaced apart in, the upper part of said jacket to define an upwardly disposed port, said baffle comprising an arcuate main segment fixedly internally secured to said jacket, and an arcuate extension disposed in overlapping relationship at one end of said main segment for circumferential adjustment towards the other end thereof to vary the size of said port.

5. A corn sheller comprising a cylindrical substantially horizontally extending jacket formed with a series of shelled corn discharge perforations in its lower portion and having intake and discharge apertures at its respective intake and discharge ends, the discharge aperture being disposed in the upper portion of the discharge end wall of said jacket, and a sheller cylinder mounted coaxially for rotation in said jacket and having its operating surface spaced radially inwardly from the cylindrical walls of said jacket so as to leave an annular chamber surrounding said cylinder, in combination with an arcuate circumferentially extensible baffle disposed in said jacket beneath said cylinder with its ends extending into the upper part of said jacket and being spaced apart to define a port through said baffle to allow passage of cobs and husks therethrough, said baffle being disposed between the intake and discharge apertures of said jacket at a point where the husking and shelling of the corn will have been substantially completed, and a radially projecting radially adjustable beater pin fixedly mounted on said cylinder for rotation closely adjacent said port to engage and dislodge any cobs or husks which may be projecting through and lodged in said port.

6. A corn sheller comprising a substantially horizontally extending jacket formed with a series of shelled corn discharge perforations in its lower portion and having intake and discharge apertures at its respective intake and discharge ends, the discharge aperture being disposed in the upper portion of the discharge end wall of said jacket, and a sheller cylinder mounted for rotation in said jacket, in combination with a circumferentially extensible baffle mounted in said jacket between said apertures at a point where the husking and shelling of the corn in its passage through the sheller will have been substantially completed to divide the space surrounding said cylinder into shelling and separating compartments respectively, said baffle being disposed circumferentially around and extending radially towards said cylinder and being formed with an upwardly disposed port establishing communication between said shelling and separating compartments, said baffle serving to permit passage of the husks and cobs through said port from the shelling compartment into the separating compartment while preventing passage of all but a small part of the shelled corn therethrough, and a radially projecting beater pin mounted on said cylinder for rotation closely adjacent said port to engage and dislodge any cobs or husks which may be projecting through and lodged in said port.

7. A corn sheller comprising a substantially horizontally extending jacket formed with a series of shelled corn discharge perforations in its lower portion and having intake and discharge apertures at its respective intake and discharge ends, and a sheller cylinder mounted for rotation in said jacket, in combination with a baffle mounted in said jacket at a point longitudinally thereof where the husking and shelling of the corn in its passage therethrough will have been substantially completed to divide the space surrounding said cylinder into longitudinally aligned shelling and separating compartments respectively, said baffle being disposed circumferentially around said cylinder with its outer periphery in such close proximity to the jacket as to prevent the passage of shelled corn between said jacket and baffle, and its inner periphery in such close proximity to said cylinder as to bar the passage of cobs and husks between said baffle and cylinder, the upper portion of said baffle being provided with a port permitting the passage of cobs and husks therethrough from the upper portion of said shelling compartment into the upper portion of said separating compartment, and a radially projecting beater pin mounted on said cylinder in said separating compartment for rotation closely adjacent said baffle to engage and dislodge any husks or cobs which may be projecting through and lodged in said port.

8. A corn sheller comprising a substantially horizontally extending jacket formed with a series of shelled corn discharge perforations in its lower portion and having intake and discharge apertures at its respective intake and discharge ends, the discharge aperture being disposed in the upper portion of the discharge end wall of said jacket, and a sheller cylinder mounted for rotation in said jacket, in combination with a circumferentially extensible baffle mounted in said jacket between said apertures at a point where the husking and shelling of the corn in its passage through the sheller will have been substantially completed to divide the space surrounding said cylinder into shelling and separating compartments respectively, said baffle being disposed circumferentially around said cylinder with its outer periphery in such close proximity to the jacket as to prevent the passage of shelled corn between said jacket and baffle, and its inner periphery in such close proximity to said cylinder as to bar the passage of cobs and husks between said baffle and cylinder, the upper portion of said baffle being provided with a port permitting the passage of cobs and husks therethrough from the upper portion of said shelling compartment into the upper portion of said separating compartment.

9. A corn sheller comprising a substantially horizontally extending jacket formed with a series of shelled corn discharge perforations in its lower portion and having intake and discharge apertures at its respective intake and discharge ends, and a sheller cylinder mounted for rotation in said jacket, in combination with a baffle fixedly mounted in said jacket at a point longitudinally thereof where the husking and shelling of the corn in its passage therethrough will have been substantially completed to divide the space surrounding said cylinder into shelling and separating compartments respectively, said baffle being disposed circumferentially around said cylinder with its outer periphery in such close proximity to the jacket as to prevent the passage of shelled corn between said jacket and baffle, and its inner periphery in such close proximity to said cylinder as to bar the passage of cobs and husks between said baffle and cylinder, the upper portion of said baffle being provided with a port permitting the passage of cobs and husks therethrough.

10. A corn sheller comprising a substantially horizontally extending shelling jacket formed with a series of shelled corn discharge perforations in its lower portion, and a sheller cylinder mounted for rotation in said jacket, in combination with a baffle mounted in said jacket at a point longitudinally thereof where the husking and shelling of the corn in its passage through the sheller will have been substantially completed to divide the space surrounding said cylinder into shelling and separating compartments respectively, said baffle being disposed circumferentially around and extending radially inwardly towards said cylinder into such close proximity therewith as to prevent passage of cobs and husks between said baffle and cylinder, and having a port formed through its upper portion to establish communication between said shelling and separating compartments.

11. A corn sheller comprising a sheller jacket formed with a series of shelled corn discharge perforations in its lower portion, and a sheller cylinder mounted for rotation in said jacket, in combination with a baffle mounted in said jacket at a point longitudinally thereof where the husking and shelling of the corn in its passage therethrough will have been substantially completed, said baffle being disposed circumferentially around and extending radially inwardly towards said cylinder and having a port formed through its upper portion.

12. A corn sheller comprising a sheller jacket, and a sheller cylinder mounted for rotation in said jacket, in combination with a transversely disposed baffle mounted in said jacket in snug engagement with the walls thereof, said baffle extending circumferentially around and radially inwardly towards said cylinder and having a port formed through its upper portion.

AQUILA D. MAST.